United States Patent
Ido et al.

(10) Patent No.: US 6,356,692 B1
(45) Date of Patent: Mar. 12, 2002

(54) OPTICAL MODULE, TRANSMITTER, RECEIVER, OPTICAL SWITCH, OPTICAL COMMUNICATION UNIT, ADD-AND-DROP MULTIPLEXING UNIT, AND METHOD FOR MANUFACTURING THE OPTICAL MODULE

(75) Inventors: Tatemi Ido; Takamitsu Nagara, both of Kodaira; Hirokazu Ichikawa, Tokorozawa; Akira Kuwahara, Fujisawa; Taira Kinoshita, Kokubunji, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/391,249

(22) Filed: Sep. 7, 1999

(30) Foreign Application Priority Data

Feb. 4, 1999 (JP) .............................. 11-026980

(51) Int. Cl.[7] .......................... H04J 14/02; G02B 6/36; G02B 6/12; G02B 6/26
(52) U.S. Cl. ......................... 385/129; 385/88; 385/89; 385/14; 385/46
(58) Field of Search .............................. 385/88, 89, 14, 385/46, 129, 132

(56) References Cited

U.S. PATENT DOCUMENTS 5,621,837 A * 4/1997 Yamada ..................... 385/88
5,917,980 A * 6/1999 Yoshimura ................. 385/129
6,161,631 A * 12/2000 Kawanishi ................. 385/14

* cited by examiner

*Primary Examiner*—Georgia Epps
*Assistant Examiner*—Michael A. Lucas
(74) *Attorney, Agent, or Firm*—Antonelli, Terry, Stout & Kraus, LLP

(57) ABSTRACT

A method is supported for aligning the height of a polymer waveguide to the height of a core layer of a semiconductor element in an optical module composed so as to mount the semiconductor element on its polymer waveguide substrate. In order to achieve the method, at first a waveguide is formed on the silicon substrate coated with an oxide film using a polymer whose refractive index is larger than that of the oxide film. The waveguide consists of a lower cladding layer, a core layer, and an upper cladding layer. The lower cladding layer is formed to be thinner than the conventional one and the height of the core layer is set to 5 to 10 $\mu$m. In this way, it is possible to fabricate an optical module in less process steps and at a lower cost than the conventional one.

19 Claims, 8 Drawing Sheets

OPTICAL INTENSITY

OPTICAL MODULE, TRANSMITTER, RECEIVER, OPTICAL SWITCH, OPTICAL COMMUNICATION UNIT, ADD-AND-DROP MULTIPLEXING UNIT, AND METHOD FOR MANUFACTURING THE OPTICAL MODULE

BACKGROUND OF THE INVENTION

The present invention relates to an optical module, a transmitter, a receiver, an optical switch, an optical communication unit, an add-and-drop multiplexing unit, and a method of manufacturing the optical module.

In recent years, measures have been considered in various circles for providing silica waveguides, as well as such optical integrated circuits as optical splatters, wavelength division multiplexers/demultiplexers, optical switches, and the like, which use a silica waveguide to enhance the functions of optical parts for communications, as well as to reduce the size and cost of those parts. Measures have also been considered for obtaining high performance optical modules to be realized by mounting a semiconductor optical device, such as laser diodes and photo-diodes, on a substrate with optical integrated circuits. Those optical modules, when used for a wavelength division multiplexing (WDM) transmission unit and an optical add-and-drop multiplexing (ADM) unit, can enhance the performance of the object communication system, as well as cut down the size and cost of the same significantly. Optical modules, in each of which a semiconductor optical element is mounted in a silica waveguide, are described collectively in the Technical Digest of Third Optoelectronics and Communications Conference, Makuhari, Japan, p. 370–371 (1988). In this document, a WDM light source module is realized with semiconductor amplifiers mounted on a substrate with a waveguide array having diffraction gratings on a substrate. And, a wavelength converter module is realized with a semiconductor optical amplifier mounted on a substrate with a 3 dB coupler circuit. Furthermore, a fast wavelength filter is realized with semiconductor optical amplifiers mounted between two arrayed waveguide grating (AWG) wavelength multiplexers/demultiplexers.

On the other hand, not only silica waveguides but also polymer waveguides have been under examination. A polymer waveguide is fabricated by coating a silicon (Si) substrate with varnish obtained by dissolving a polymer in a solution.

Consequently, when compared with the silica waveguide, the mass productivity is higher and the cost is lower. The polymer waveguide also has a large thermo-optical coefficient. If such a polymer waveguide is used, therefore, it is possible to compose an optical integrated circuit, such as a wavelength tunable filter and a digital optical switch, with enhanced functions which have never been realized in a silica waveguide. A wavelength tunable wavelength division multiplexer is described in, for example, IECE Transactions on Electronics, Vol. 7, p.1020–1026 (1026) and a digital optical switch is described in the Technical Digest of the Third Optoelectronics and Communications Conference, Makuhari, Japan, p.66–67 (1998). Just like the silica waveguide, mounting a semiconductor optical element in a polymer waveguide or in an optical integrated circuit which uses such a polymer waveguide will result in a high performance optical module.

SUMMARY OF THE INVENTION

In spite of the above-mentioned favorable characteristics of the polymer waveguide, there are still some problems which must be solved. For example, in order to make sure that a high optical coupling efficiency is obtained between a waveguide type semiconductor optical element mounted on a substrate and a polymer waveguide or a polymer optical integrated circuit fabricated on the same substrate, the height of the light axis of the polymer waveguide must be aligned with the height of the light axis of the semiconductor optical element. At this time, the refractive index difference between the core layer and the cladding layer of the polymer waveguide is usually set to 0.3 to 1% and the thickness of the core layer is set to 5 to 8 $\mu$m considering the loss of coupling with an optical fiber, the fabrication tolerance of the optical circuit, and the size of the optical circuit. If a polymer waveguide is formed on an Si substrate, a lower cladding layer must be formed at a thickness of 10 $\mu$m or more so as to suppress an increase of the propagation loss and the polarization dependent loss (PDL), which are caused by the Si substrate. Consequently, the height of the core layer in the center portion from the surface of the substrate becomes 13 $\mu$m or more. On the contrary, the height of the core layer of the semiconductor optical element in the center portion from the surface of the substrate is at most 5 to 12 $\mu$m when the optical element is flip-chip bonded on the substrate. The difference in height between those items becomes at least 1 $\mu$m, so that the optical coupling loss between the semiconductor element and the polymer waveguide becomes very large. In order to align both of those items in height, two methods have been proposed. According to the first method, a projection referred to as a terrace is formed at a portion of the Si substrate, where a semiconductor element is mounted. The method already has been applied to silica waveguides. In this case, however, the manufacturing will become difficult, since both polymer and Si must be polished and flattened simultaneously when this method is applied to forma polymer waveguide. The second method applicable to such a height alignment of the polymer waveguide is described in IEICE technical report, EMD98-55 (1988). According to this method, part of the lower cladding layer on which a semiconductor element is to be mounted is left as is, and then the element is mounted on the left-over lower cladding layer (referred to as a pedestal). This method, however, also creates problems in that the temperature characteristics of the laser diode are degraded, since the laser diode comes to be mounted on a polymer with a low thermal conductivity, and a metallic layer must be formed in the middle of the lower cladding layer so as to stop the etching at a predetermined height.

Under such circumstances, it is an object of the present invention to provide an optical module which solves the foregoing problems and may be produced at lower prices than conventional ones.

The first object of the present invention is therefore to propose a method and a structure for matching the height of the polymer waveguide to the height of the core layer of a semiconductor element with less degradation of the characteristics and with fewer fabrication processes in an optical module provided with a waveguide type semiconductor element mounted on its substrate provided with a polymer waveguide or an optical integrated circuit composed of such a polymer waveguide, thereby providing an optical module of higher performance and lower cost than conventional ones. The second object of the present invention is to provide an optical communication unit which uses an optical module so as to enhance the functions and reduce the cost to an extent greater than conventional ones.

The present invention is characterized by an optical module which is composed as follows: At first, a polymer waveguide is formed at a portion of a silicon substrate coated with an oxide silicon film thereon, so that the relational conditions of $d > \lambda/2\pi \cdot (n_{core}^2 - n_{SiO2}^2)^{1/2}$) are satisfied when it is assumed that the thickness of the oxide silicon film is d, the refractive index of the oxide silicon film is $n_{SiO2}$, the refractive index of the core layer is $n_{core}$, and the wavelength of a light transmitted through the polymer waveguide is $\lambda$. Then, a semiconductor optical element is provided at another portion of the silicon substrate, and an end face of the waveguide is coupled with an end face of the semiconductor optical element optically within a predetermined error range, and the thickness of the substrate where the waveguide is provided is practically the same as the thickness of the substrate where the semiconductor optical element is provided in a cross sectional view of the-substrate.

The first object of the present invention described above is achieved as follows: At first, a polymer waveguide provided with a lower cladding layer, a core layer, and an upper cladding layer, or an optical integrated circuit which uses the waveguide, is provided on a silicon substrate coated with an oxide silicon film. Then, part of the polymer waveguide is removed from the substrate, so that a semiconductor optical device is bonded on an electrode formed on the oxide silicon film on the substrate from which the polymer waveguide already has been removed. Here, the lower cladding layer is thinned more than in the conventional device until the height of the polymer waveguide is aligned with the height of the core layer of the optical semiconductor in the center. The core layer thus becomes 5 to 12 μm in height in the center portion. Accordingly, the lower cladding layer is set to 3 to 9 μm and the core layer is set to 5 to 8 μm in thickness. Then, both d and $n_{core}$ values are set so as to satisfy the following relational conditions among the thickness of the oxide film (d), the refractive index ($n_{SiO2}$), the refractive index of the core layer ($n_{core}$), and the wavelength of the light transmitted in the waveguide ($\lambda$). This is to prevent the leakage of the light to the Si substrate.

$$D > \lambda (2\pi \cdot (n_{core}^2 - n_{SiO2}^2)^{1/2})$$

Since the thickness of an oxide film to be formed easily with a thermal oxidization method is not more than 1.5 μm, the $n_{core}$ value is set to 1.47 or more. In addition, the $n_{core}$ should be set to 1.55 or less so as to reduce the reflection of the light at the boundary between an end face of the waveguide and an optical fiber. Accordingly, the d value should be set to 0.4 μm or over. Taking into consideration the loss of the optical fiber at the connections, as well as the fabrication tolerance of the optical circuit, the refractive index of the core layer is set 0.3 to 1% larger than that of the upper/lower cladding layer. Fluorinated polyimide can be used as a polymer material for the lower cladding layer, the core layer, and the upper cladding layer. A semiconductor laser diode or a waveguide type photo-diode can be used as the semiconductor elements and a branching circuit, an arrayed waveguide grating wavelength division multiplexer/demultiplexer, an optical switch, or the like can be used as the optical integrated circuit and a plurality of laser elements or a laser array, each having a different oscillation wavelength, can be used to compose a semiconductor element and an optical branching circuit can be used as an optical integrated circuit, thereby composing a WDM transmitter module. And, a plurality of waveguide photo-diodes or a photo-diode array can be used to compose a semiconductor element and a waveguide array grating wavelength division multiplexer/demultiplexer can be used as an optical integrated circuit, thereby composing a WDM receiver module. In the same way, a waveguide photo-diode can be used as a semiconductor element and an optical switch can be used as an optical integrated circuit, thereby composing an optical switch with monitoring functions.

The second object of the present invention described above can be achieved with an optical transmission unit, as well as an optical add-and-drop unit using the optical modules described above.

Another layer can also be formed between the substrate and a polymer waveguide, which is to be used as the waveguide described above. The layer should preferably be a thin film layer.

DESCRIPTION OF THE PREFERRED EMBODIMENTS

Figure 1:
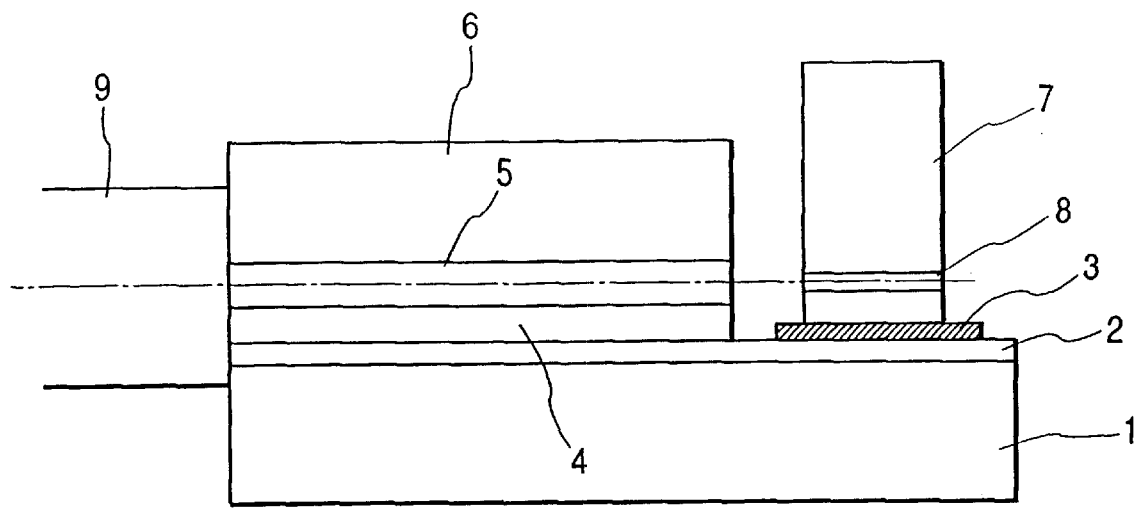
FIG. 1 is a vertical cross sectional view along the optical waveguide of an optical module obtained by mounting a semiconductor element on a polymer waveguide substrate representing an embodiment of the present invention.
Figure 2:
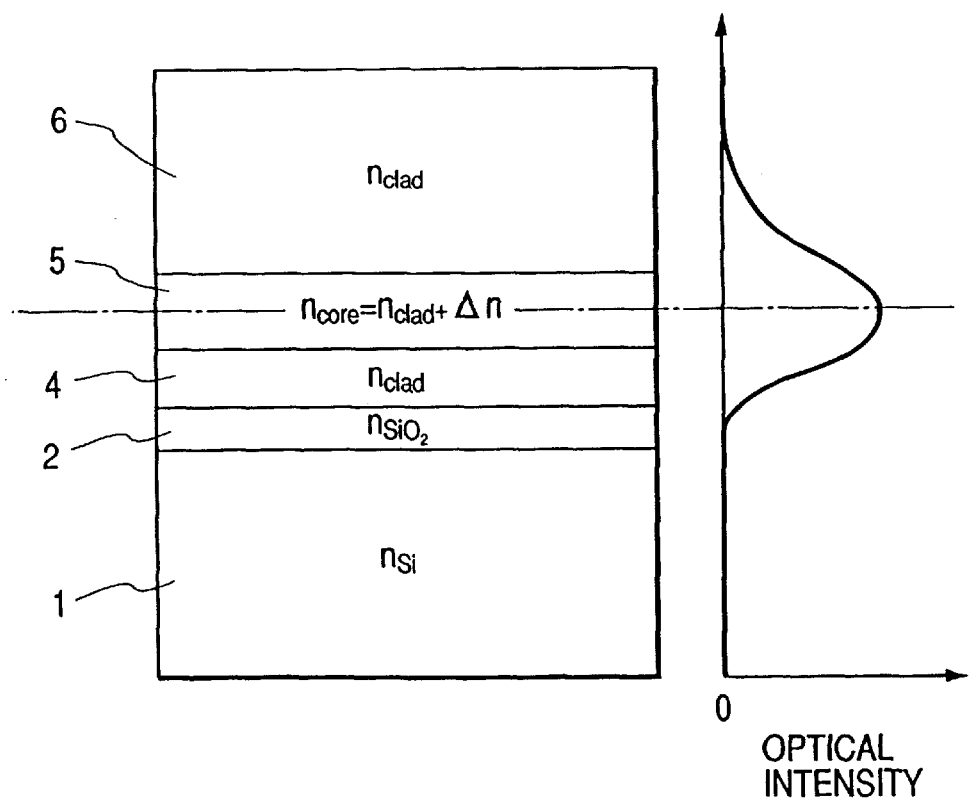
FIG. 2 is a diagram which shows an optical intensity distribution of a waveguide in an embodiment of the present invention.

Hereunder, an embodiment of the present invention will be described with reference to FIGS. 1 to 3. FIG. 1 is a cross sectional view of an optical module, which is cut along the light axis of the waveguide. The optical module is provided with a semiconductor element mounted on a polymer waveguide substrate in the embodiment of the present invention. FIG. 2 shows an optical intensity distribution in the fundamental mode of the waveguide in an optical module in this embodiment of the present invention.

The optical module in this embodiment of the present invention is composed as follows: On a silicon (Si) substrate coated with an oxide silicon (SiO$_2$) film 2, there is provided a waveguide consisting of a lower cladding layer 4, a core layer 5 and an upper cladding layer 6 Each of the lower cladding layer 4, the core layer 5, and the upper cladding layer 6 consists of a polymer whose refractive index is larger than that of the SiO$_2$ film. The SiO$_2$ film can not only function as a passivation film for an electrode 3, but also can prevent leakage of the light from the waveguide into the Si substrate. If this SiO$_2$ film cladding effect is sufficient, the optical loss in the waveguide can be suppressed to a low level even when the lower cladding layer 4 is thin (3 to 9 μm). The inventor has turned his attention to this advantage in such a waveguide. Since the lower cladding layer 4 can be formed thinner than the conventional one, a semiconductor element 7 can be mounted directly on an electrode 3 formed on the SiO$_2$ film 2 without using a structure such as the terrace, the pedestal, etc. described above, and thereby the core layer 8 of the semiconductor element and the active layer 5 of the polymer waveguide are aligned with each other in the center portion. A high optical coupling between them can thus be easily obtained. Although there is a thermal oxidization method which is effective for forming a high quality SiO$_2$ film on a silicon substrate at a low cost, usually the thermal oxidization method can form only SiO$_2$ films whose thickness is about less than 1.5 μm. Therefore, at first, the inventor was apprehensive of such a thickness of the SiO$_2$ film, which would not be sufficient to suppress the leakage of the light into the Si substrate. Later, however, it was found that such apprehensions could be eliminated by setting the refractive index of each of the lower cladding layer 4, the core layer 5, and the upper cladding layer 6 to be formed on the SiO$_2$ film so as to be larger than the predetermined value of the SiO$_2$ film (about 1.46). This will be described below quantitatively. Consequently, the optical intensity of the waveguide, as shown in FIG. 2, is attenuated suddenly in the SiO$_2$ film, thereby preventing the leakage of light onto the Si substrate. In addition, since the optical intensity is distributed asymmetrically in the waveguide in the embodiment of the present invention, as shown in FIG. 2, one would expect that the loss of coupling between an end face of the waveguide and the optical fiber connected to the end face would be increased significantly. Actually, however, the lower cladding layer is 3 μm or more in thickness. Therefore, it is only at the tail of the optical field, where the optical intensity is low that the light beam is affected by the SiO$_2$ layer and shaped asymmetrically. Consequently, the loss of coupling with the optical fiber 9 is increased at most 0.3 dB when compared with that of the conventional one.

Next, a description will be made qualitatively for how to set a refractive index for the polymer and a thickness for the oxide film properly to reduce the leakage of the light onto the Si substrate. The optical intensity in a waveguide is reduced exponentially in the SiO$_2$ film 2. The penetration depth L (a length at which the field intensity becomes 1/e) is found as shown in expression (1) below when the effective refractive index of the fundamental mode in the waveguide is $n_{eff}$.

$$L=\lambda/(2\pi\cdot(n_{eff}^2-n_{SiO2}^2)^{1/2}) \quad (1)$$

If the refractive index difference (Δn) of the core cladding layer is small, the L value can be approximated as shown below in expression (2).

$$L=\lambda/(2\pi\cdot(n_{core}^2-n_{SiO2}^2)_{1/2}) \quad (2)$$

Figure 3:
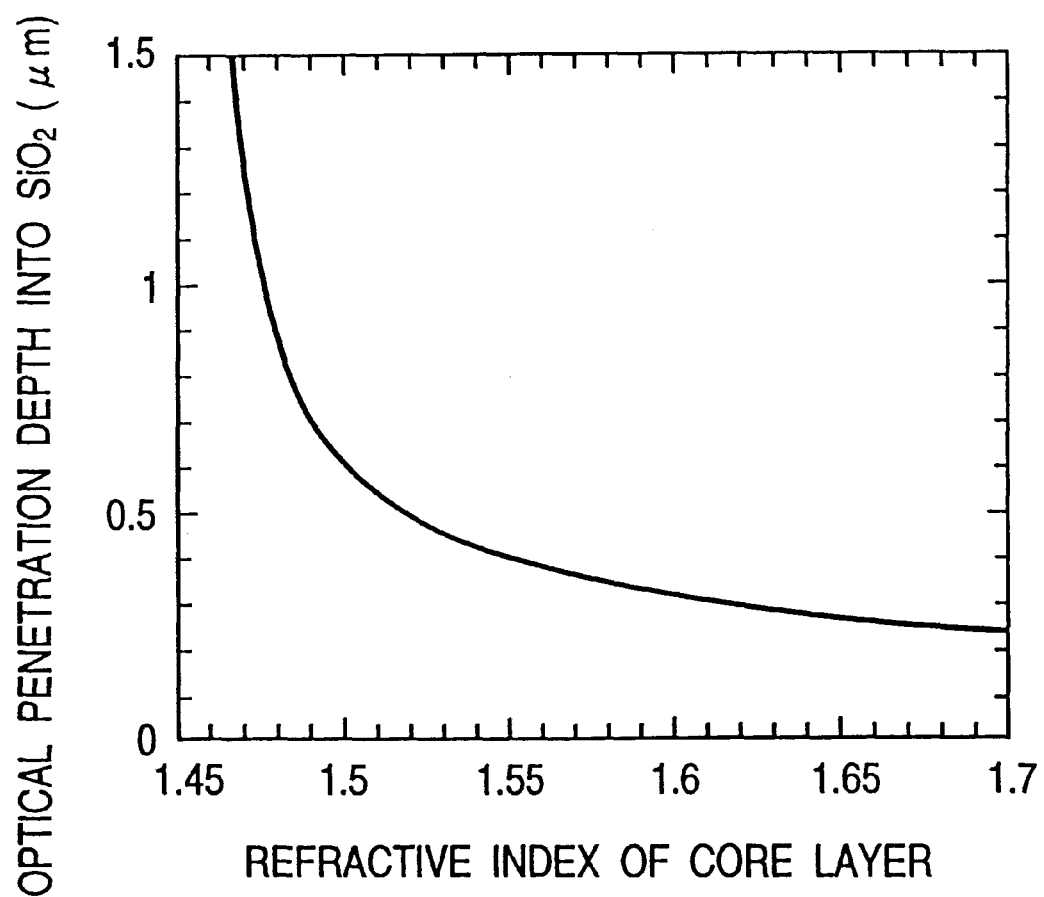
FIG. 3 is a graph which shows the relationship between the refractive index of a core layer and the penetration depth of the optical field into an oxide silicon film.

FIG. 3 shows the relationship L and $n_{core}$. when $n_{SiO2}$=1.46 is set. Therefore, it is only necessary to set the $n_{core}$ value for the thickness of the oxide film (d) in order to prevent the leakage of light onto the Si substrate.

$$L<d \quad (3)$$

For example, as shown in FIG. 3, $n_{core}$>1.47 can be set when d takes the maximum value of 1.5 μm, which can be obtained easily through thermal oxidization. The refractive index of the polymer layers can be set at any value within a wide range of 1.3 to 1.7 by properly choosing the polymer composition and/or controlling fluorination content. Consequently, if d is 0.25 μm or over, the conditions shown in the expression (3) can be satisfied. Actually, however, if the $n_{core}$ value is too large, a problem arises in that the reflection of the light is increased significantly due to the refraction index difference between the silica optical fiber 9 provided at an end face of the waveguide and the end face itself of the waveguide. Therefore, setting an unnecessarily large value for $n_{core}$ should be avoided. For example, the $n_{core}$ value should be set to 1.55 or less in order to suppress the light reflection to −30 dB or less. At this time, the d value should be set to 0.4 μm or more to satisfy the conditions shown in the expression (3).

Hereunder, various embodiments of the present invention will be described in detail.

First Embodiment

Figure 4A:
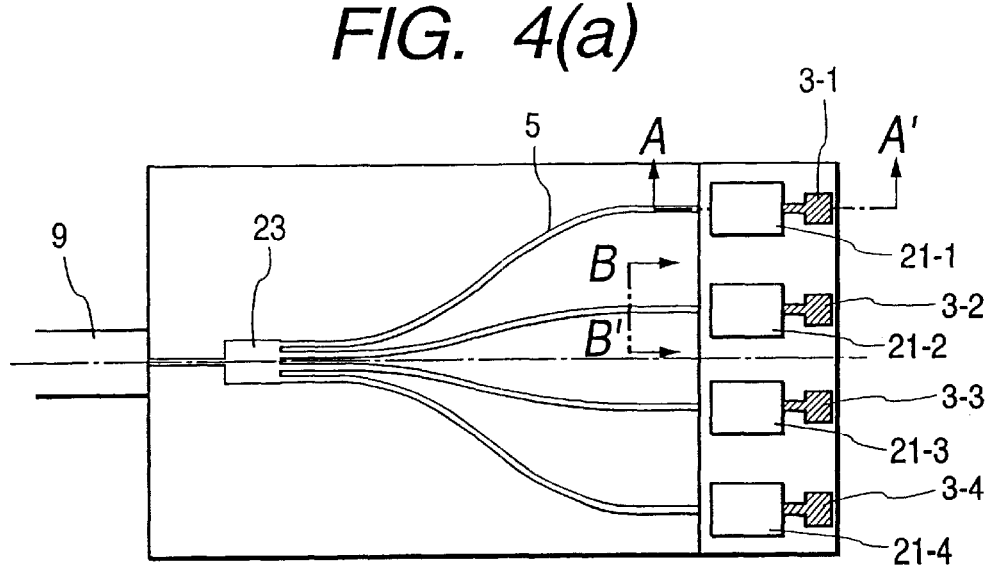
FIG. 4(a) is a top plan view of a WDM transmitter module representing an embodiment of the present invention.
Figure 4B:
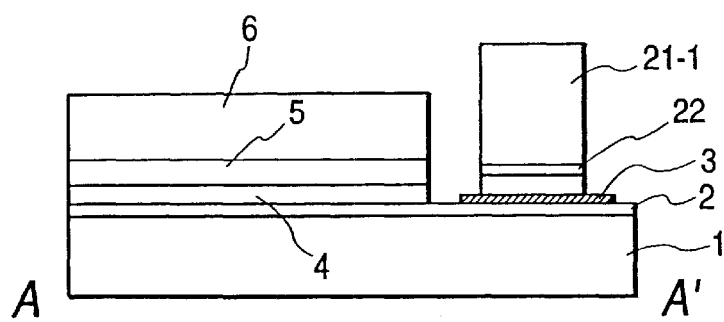
FIG. 4(b) is a section taken along line A–A' in FIG. 4(a)
Figure 4C:
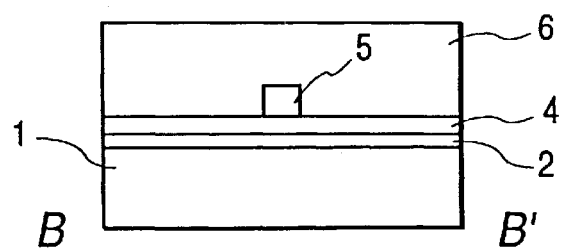
FIG. 4(c) is a section taken along line B–B' in FIG. 4(a).

At first, a WDM transmitter module (FIG. 4(a)) representing an embodiment of the present invention will be described. This transmitter module is provided with four DFB (Distributed Feed Back) laser diodes 21-1 to 21-4 mounted on a polymer waveguide substrate which has a 1:4 optical branching circuit 23. Each of the four laser elements has a different wavelength. An optical fiber 9 is connected to an end face of the substrate. The optical signals generated from these four DFB laser elements, each having a different wavelength, are multiplexed in the optical branching circuit 23 and output to the optical fiber 9.

This WDM transmitter module is fabricated in the processes shown in FIGS. 9(a) to 9(f). At first, Ti/Au electrodes 3-1 to 3-4 are formed on the surface of an Si substrate coated with a thermal oxide film 2 (d=1 μm) all over (FIG. 9(a) After that, two kinds of polyamic acid precursors of fluorinated polyimides N-N dimethylacetoamide solution are spin-coated on the substrate and baked sequentially, thereby forming a lower cladding layer 4 (d=5.0 μm) thick and a core layer 5 (d=6.0 μm) consisting of fluorinated polyimide (FIG. 9(b)). Then, a photo-resist is formed on the core layer 5, so that part of the core layer 5 is removed by reactive ion-etching which uses an O$_2$ gas. After that, the waveguide and the branching circuit are patterned (FIG. 9(c)). At this time, the waveguide width, except for the branching portion, is set to 6.0 μm. In the same way, the surface of the patterned portions are spin-coated with varnish and baked, forming an upper cladding layer 6 (d=15 μm) consisting of fluorinated polyimide (FIG. 9(d)).

At this time, the refractive indexes of both the lower and upper cladding layers must be 1.520 and the refractive index of the core layer must be 1.526. The refractive index difference (Δn) between them must be 0.006 (0.4%). The fluorinated polyimide having such a refractive index is described in, for example, the Journal of Lightwave technology, vol.16, p.1024–1029 (1998). Next, the lower cladding layer on which elements are to be mounted, the core layer, and the upper cladding layer are removed completely by dry-etching, thereby exposing the electrodes 3-1 to 3-4 (FIG. 9(e)). On those electrodes, DFB laser elements 21-1 to 21-4 are flip-chip bonded, each having a different wavelength (1551.2, 1552.0, 1552.8, or 1553.6 μmm), using AuSn solder (FIG. 9(f)). Finally, an optical fiber 9 is connected to an end face of the waveguide. The height from the SiO$_2$ surface of the DFB laser active layer in the center portion is about 8 μm, which is almost aligned to the height of the core layer of the polymer waveguide in the center portion. The loss of the coupling between the laser and the polymer waveguide thus becomes 10 dB or under. The transmission loss of the waveguide is 0.4 dB/cm, which is almost the same as that of a waveguide having a thicker (>15 µm) lower cladding layer. The loss of the coupling between the optical fiber and the polymer waveguide is thus suppressed to 0.3 dB. If a current of about 60 mA is applied to each laser diode, a WDM light signal of −8 dBm per wavelength is obtained at the output of the optical fiber.

Second Embodiment

Figure 5A:
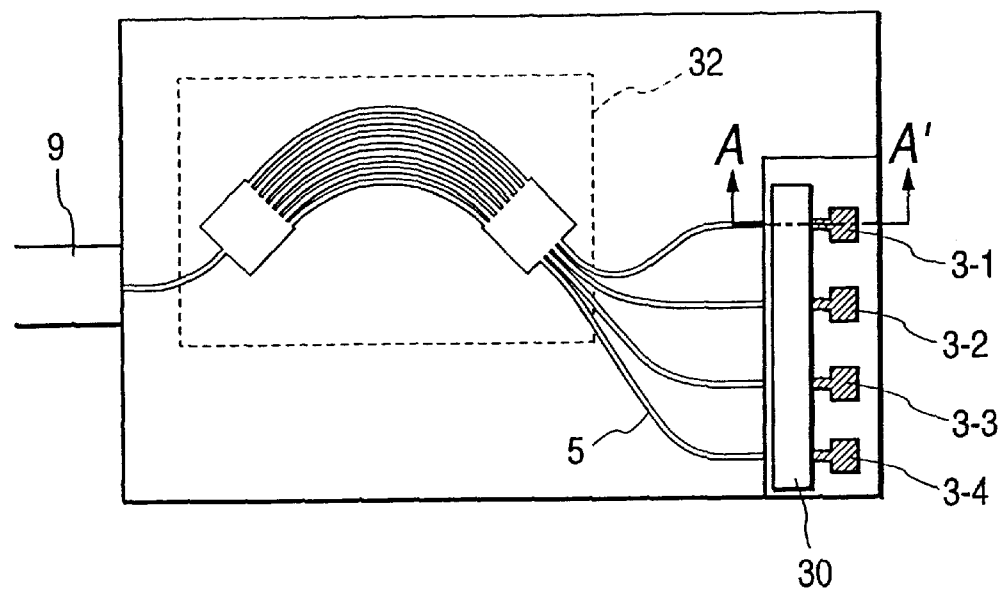
FIG. 5(a) is a top plan view of a WDM receiver module representing an embodiment of the present invention.
Figure 5B:
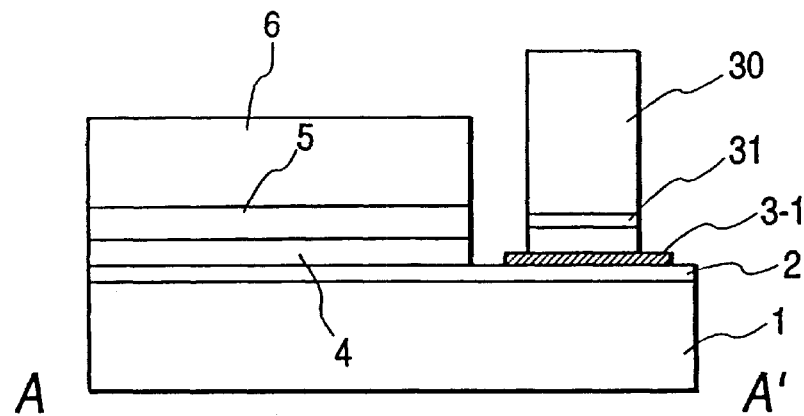
FIG. 5(b) is a section taken along line A–A' in FIG. 5(a).

Next, the WDM receiver module (FIG. 5(a)) representing another embodiment of the present invention will be described. In this receiver module, a waveguide photo-diode (PD) array (N=4) 30 is mounted on a substrate provided with an arrayed waveguide grating (AWG) multiplexer/demultiplexer composed of a polymer waveguide. An optical fiber 9 is connected to an end face of the waveguide. A WDM optical signal entered through the optical fiber 9 is demultiplexed into wavelengths in the AWG multiplexer/demultiplexer 32, then each of the wavelengths is converted to an electric signal in the PD array 30. This WDM receiver module is fabricated in the following processes. At first, Ti/Au electrodes 3 are formed on the surface of an Si substrate which is coated all over with a thermal oxide film 2 (d=1 µm). After that, two kinds of polyamic acid varnishes are spin-coated and baked on those electrodes sequentially so as to form a lower cladding layer 4 (d=5.0 µm) consisting of fluorinated polyimide and a core layer 5 (d=5.0 µm) on those electrodes. Next, unnecessary portions of the core layer 5 are removed by reactive ion-etching which uses an $O_2$ gas, thereby patterning the waveguide and the AWG multiplexer/demultiplexer. In the same way, the surface is coated with varnish through spin-coating, then baked, thereby forming an upper cladding layer 6 (d=15 µm) consisting of a fluorinated polyimide. The refractive indexes of the lower and upper cladding layers must be 1.520 and the refractive index of the core layer must be 1.535. The refractive index difference (Δn) between them must be 0.015 (1.0%). The size of the core layer is 5 µm×5 µm. Next, the polymer layer on which a PD array is to be mounted is removed completely by dry-etching, thereby exposing the electrodes 3-1 to 3-4 (FIG. 9(e)). On those electrodes there is then mounted a waveguide PD array 30 for four channels using AuSn solder in a flip-chip bonding manner (FIG. 9(f)). Finally, an optical fiber 9 is connected to an end face of the waveguide. The height of the PD array from the $SiO_2$ surface in the center portion of the absorbing layer 31 is about 8 µm, which is almost aligned with the height in the center portion of the core layer of the polymer waveguide. The loss of the optical coupling between the PD and the polymer waveguide thus becomes 0.5 dB or less. The AWG demultiplexer is designed so as to have a center wavelength of 1552.4 nm, a wavelength pitch of 0.8 nm, and four channels. When an experimental optical receiver module was supplied with a multiplexed signal obtained from wavelengths of 1551.2, 1552.0, 1552.8, and 1553.6 nm, an optical current corresponding to each wavelength was obtained from each of the four electrodes. The receiving sensitivity was 0.2 A/W or greater and the inter-wavelength cross talk was favorably at −30 dB or less.

Third Embodiment

Figure 6A:
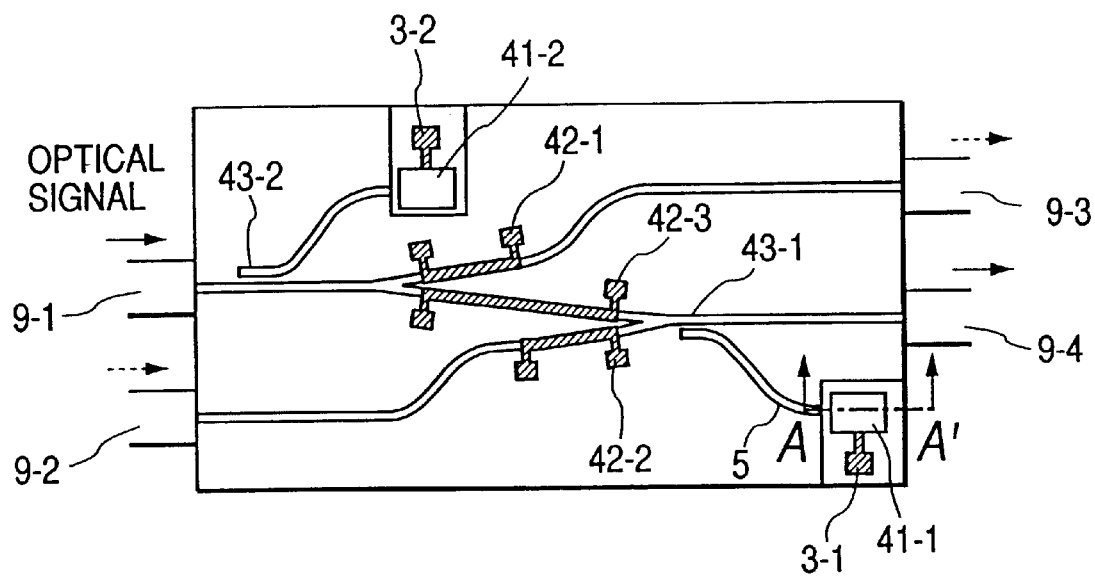
FIG. 6(a) is a top plan view of an optical switch with monitoring functions representing an embodiment of the present invention.

Next, an optical switch with monitoring functions (FIG. 6(a)) representing an embodiment of the present invention will be described. This optical switch is a 2×2-sized optical switch used for adding and dropping an optical signal as needed. Two Y-branch switches are integrated in this optical switch. The Y-branch switch makes good use of the thermal optical effect of the polymer waveguide. This optical switch outputs an optical signal received through the optical fiber 9-1 to the optical fiber 9-4 as is, when a current is applied to thin film heaters 42-1 and 42-2 and is not applied to a thin film heater 42-3. On the other hand, when a current is applied to the thin film heater 42-3 and is not applied to the thin film heaters 42-1 and 42-2, the optical switch transfers the signal received through the optical fiber 9-1 to the optical fiber 9-3 and receives a new optical signal through the optical fiber 9-2 at this time, thereby applying the new signal to the optical fiber 9-4. In addition, this optical switch is provided with couplers 43-1 and 43-2 for fetching some optical signals and waveguide PDs 41-1 and 41-2 for for monitoring each optical signal intensity.

This WDM transmitter module is fabricated by using the following processes. At first, Ti/Au electrodes 3-1 and 3-2 are formed on the surface of an Si substrate which is coated all over with a thermal oxide film 2 (d=1 µm). After that, the surface is spin-coated with two types of varnishes consisting of fluorinate polyimide, and then baked, thereby forming a lower cladding layer 4 (d=4.5 µm) consisting of fluorinated polyimide and a core layer (d=7.0 µm) (FIG. 9(b)). Then, unnecessary portions of the core layer 5 are removed by reactive ion-etching which uses an $O_2$ gas, thereby pattering a waveguide including an optical switch portion and coupler portions. In the same way, the surface is spin-coated with the varnish and baked again, forming an upper cladding layer 6 (d=20 µm) consisting of fluorinated polyimide. At this time, the refractive indexes of both the lower and upper cladding layers must be 1.520 and the refractive index of the core layer must be 1.525, that is, the refractive-index difference (Δn) between them must be 0.005 (0.3%).

The core layer of the waveguide is 7×7 µm in size. Cr film heaters 42-1 to 42-3 for switching are then formed on the upper cladding layer, and then the polymer layer on which a PD is to be mounted is removed completely by dry-etching, thereby exposing the electrodes 3-1 to 3-2 and mounting the waveguide PDs 41-1 and 41-2 on those electrodes, respectively, with AuSn solder in a junction down manner. Finally, optical fibers 9-1 to 9-4 are connected to an end face of the waveguide. The height of each PD (photo-diode) from the $SiO_2$ surface in the center portion of the absorption layer 31 is about 8 µm, which is almost aligned to the height of the core layer in the center portion of the polymer waveguide. The loss of the coupling between the PD and the polymer waveguide thus becomes 0.5 dB or less. The branching ratio of the optical coupler is set to 1:10. The loss between 9-1 and 9-4 is about 3.5 dB/cm when a current is applied to the heaters 42-1 and 42-2 of the fabricated optical switch module. When the current is applied to the heaters 42-3 (add-and-drop state), the loss at the drop port (the loss between 9-1 and 9-3) is 2.5 dB and the loss at the add port (the loss between 9-2 and 9-3) is 2.5 dB. The cross talk (loss between 9-1 and 9-4) is a favorable value of −40 dB or less. The monitors PD41-1 and 41-2 can monitor the optical intensity at an efficiency of 0.05 to 0.07 A/W to the optical input power.

Fourth Embodiment

Figure 7:
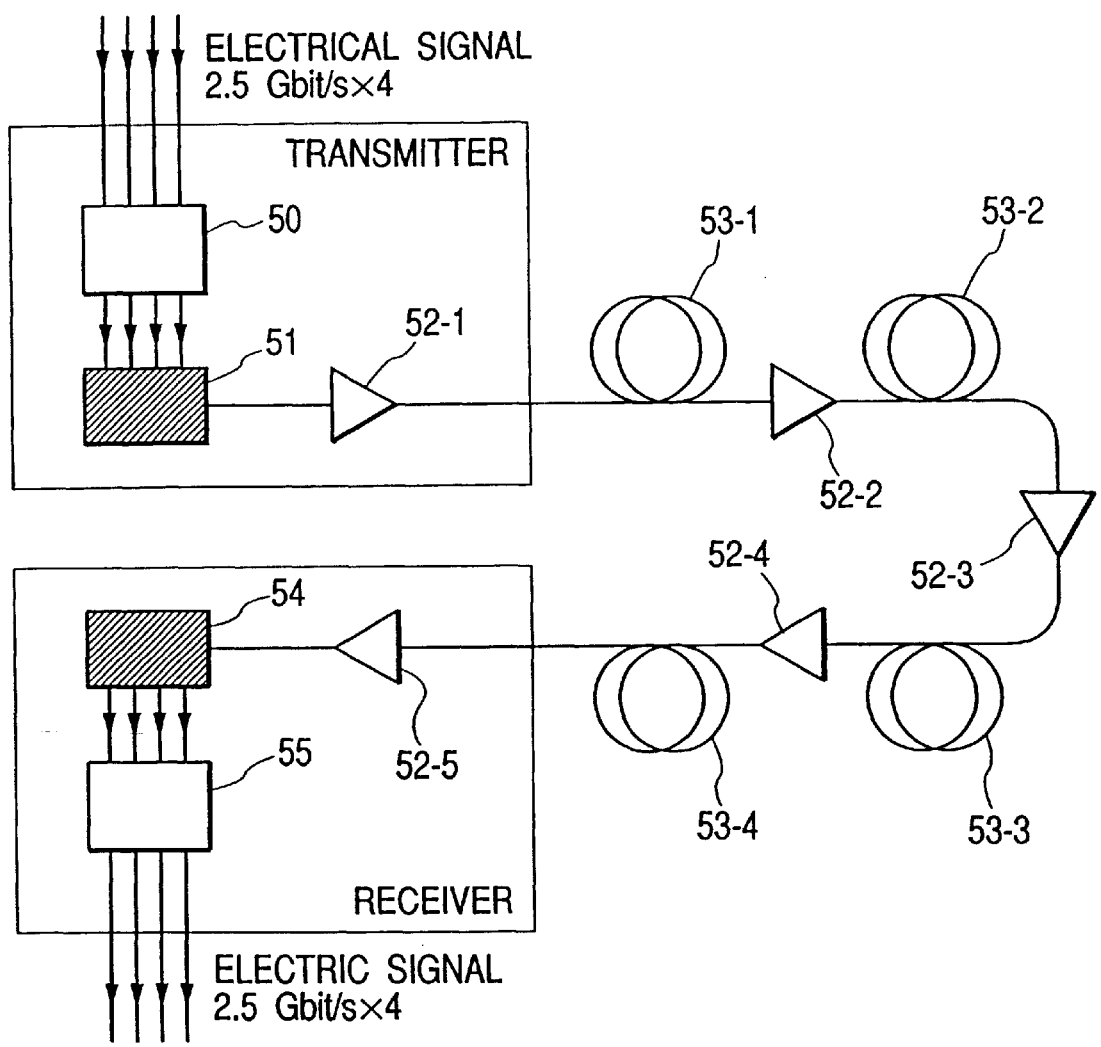
FIG. 7 is a schematic diagram of a WDM transmission unit representing an embodiment of the present invention.

Next, the WDM transmitter apparatus in an embodiment of the present invention will be described with reference to FIG. 7. The apparatus is composed of a transmitter module, as shown in FIG. 4(a), and a receiver module, as shown in FIG. 5(a). In this apparatus, electric signals (2.5 Gbit/s) for four channels are used to drive the four DFB laser elements of the transmitter module 51 so as to generate four WDM signals. Each signal is amplified in a fiber optical amplifier 52-1 and transmitted by an optical amplifier (52-2 to 52-4) through an optical fiber (53-1 to 53-4) (80 km×4=320 km). The signal is then amplified in the optical amplifier 52-5 and demultiplexed into wavelengths, and then received by the receiver module 54. The signal is thus converted to an electric signal (2.5 Gbit/s×4ch) again. The error rate (bit error rate) of this apparatus is $10^{-9}$ or less, so that normal operation is assured for the apparatus.

Fifth Embodiment

Figure 6B:
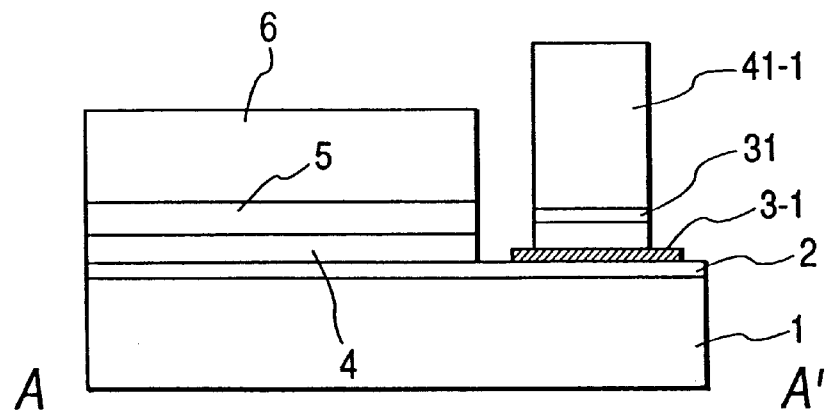
FIG. 6(b) is a section taken along line A–A' in FIG. 6(a).
Figure 8:
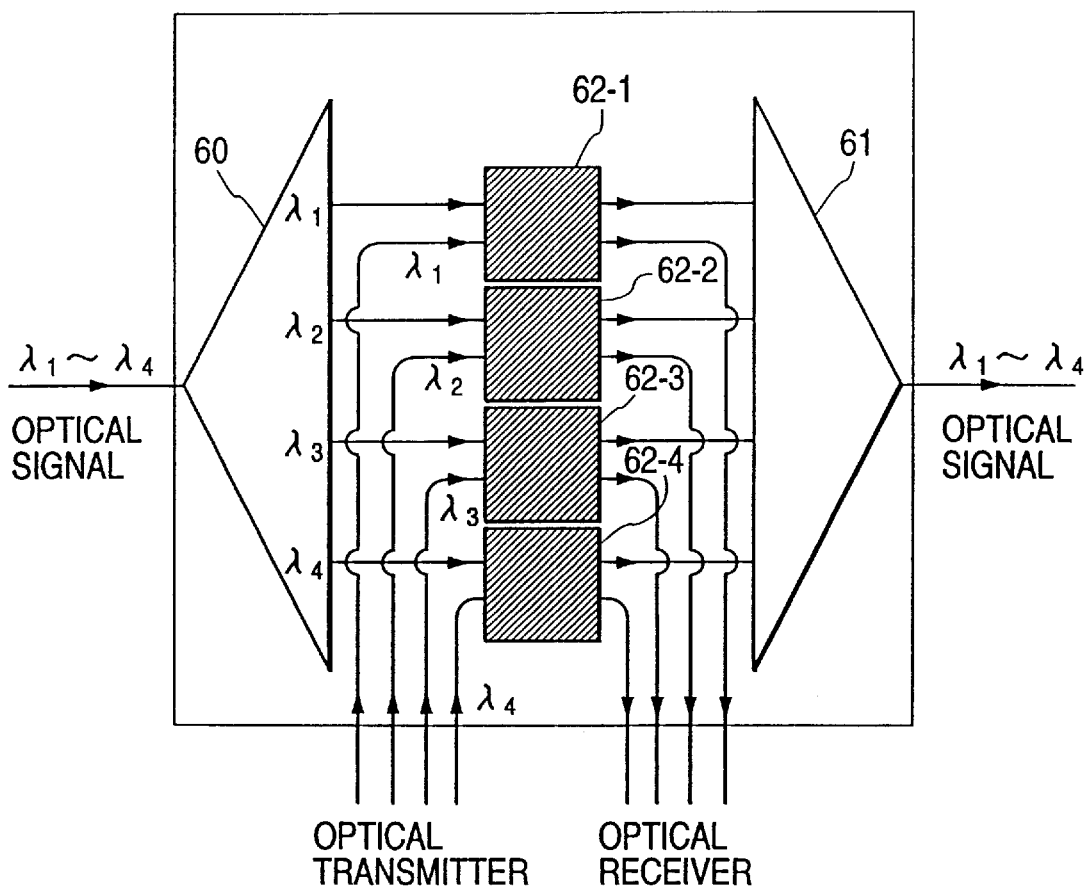
FIG. 8 is a schematic diagram of an optical add-and-drop unit in an embodiment of the present invention.
Figure 9A:
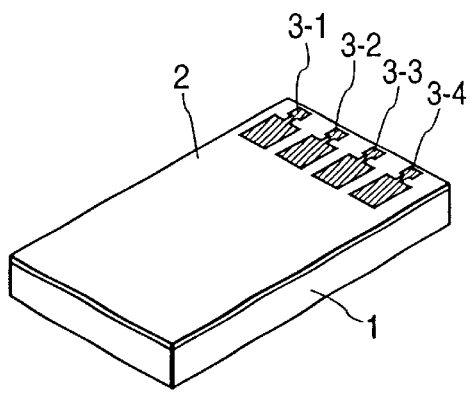
FIGS. 9(a) to 9(f) are perspective views which illustrate steps of a method for fabricating an optical module according to the present invention.
Figure 9D:
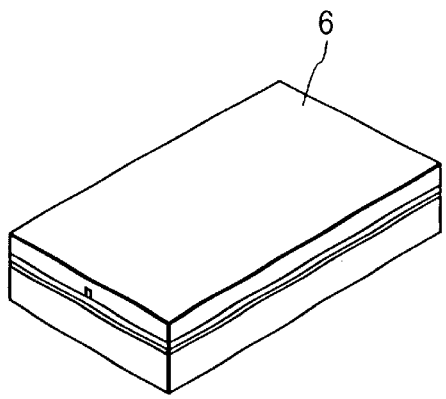
Figure 9B:
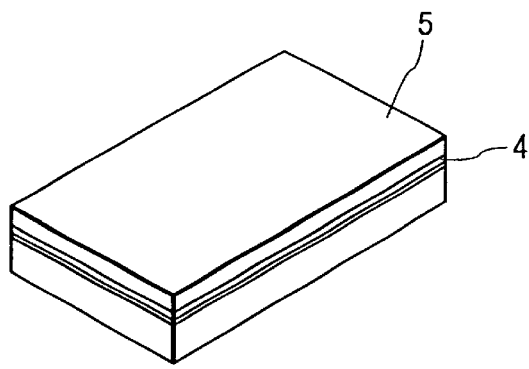
Figure 9E:
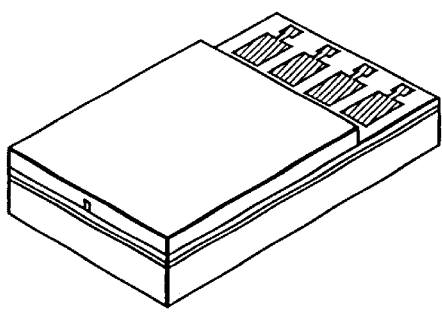
Figure 9C:
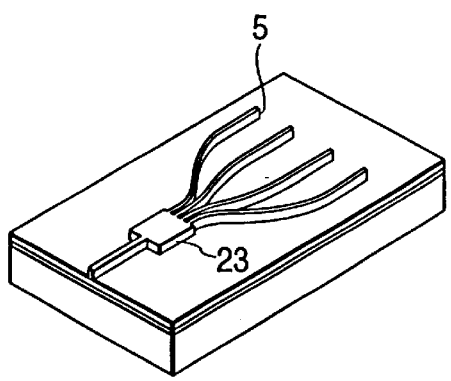
Figure 9F:
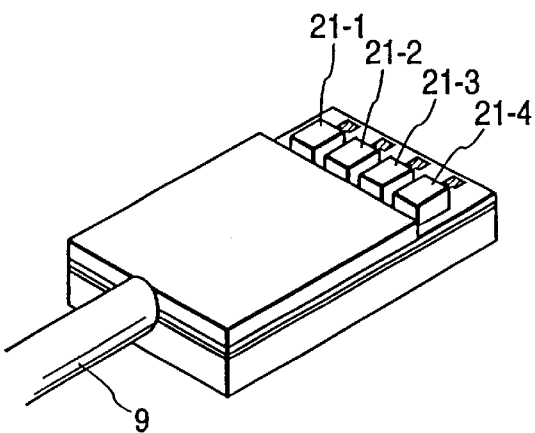

Next, an add-and-drop multiplexing (ADM) unit which uses the optical switch with monitoring functions shown in FIG. 6(*a*) will be described with reference to FIG. 8. The signal supplied to this ADM unit is demultiplexed into wavelengths by a WDM demultiplexer 60. An optical signal is added to or dropped from each of those wavelength light components as needed by an add-and-drop. switch with a 2×2 optical monitor (62-1 to 62-4), and then the components are multiplexed again and output by a WDM multiplexer 61. Since each of the switches 62-1 to 62-4 has a PD for monitoring the optical intensity, it is possible to monitor the optical intensity of the wavelength of each optical signal supplied to and output from this unit. Consequently, this unit can output an error signal when a specific wavelength signal is lost due to an error, etc. and adjust the optical output so as to equalize the power of a specific wavelength optical signal, such as those of other channels.

The technical configurations associated with the present invention are described below.

1. An optical module including:
    a silicon substrate coated with an oxide silicon film thereon; and
    a polymer waveguide formed at a portion of the silicon substrate and consisting of a core layer, an upper cladding layer, and a lower cladding layer;
    wherein relational conditions of $d>\lambda/(2\pi \cdot (n_{core}^2 - n_{SiO2}^2)^{1/2})$ are satisfied when it is assumed that the thickness of the silicon oxide film is d, the refractive index of the oxide silicon film is $n_{SiO2}$ the refractive index of the core layer is $n_{core}$, and the wavelength of a light transmitted in the polymer waveguide is $\lambda$;
    a semiconductor optical element is composed on another portion of the silicon substrate so that an end face of the element and an end face of the waveguide are coupled with each other optically within a predetermined error range; and
    the thickness of the substrate where the waveguide is provided is practically the same as the thickness of the substrate where the element is provided in a cross sectional view of the substrate.

2. An optical module including:
    a silicon substrate coated with an oxide silicon film thereon; and
    a polymer waveguide formed at a portion of the silicon substrate and consisting of a core layer and a lower cladding layer;
    wherein relational conditions of $d>\lambda/(2\pi \cdot (n_{core}^2 - n_{SiO2}^2)^{1/2})$ are satisfied when it is assumed that the thickness of the silicon oxide film is d, the refractive index of the oxide silicon film is $n_{SiO2}$, the refractive index of the core layer is $n_{core}$, and the wavelength of a light transmitted in the polymer waveguide is $\lambda$.

3. An optical module including:
    a silicon substrate coated with an oxide silicon film thereon; and
    a polymer waveguide formed on the silicon substrate coated with the oxide silicon film and consisting of a core layer and a lower cladding layer;
    wherein the oxide silicon film functions as a waveguide.

4. An optical module including:
    a silicon substrate coated with an oxide silicon film thereon; and
    a polymer waveguide formed at a portion of the silicon substrate and consisting of a core layer, an upper cladding layer, and a lower cladding layer;
    wherein these three layers and the oxide film are combined so as to function as a waveguide.

5. An optical module including:
    a silicon substrate coated with an oxide silicon film thereon; and
    a polymer waveguide formed at a portion of the silicon substrate and consisting of a core layer, an upper cladding layer, and a lower cladding layer;
    wherein the upper cladding layer is thicker than the lower cladding layer.

6. An optical module including:
    a silicon substrate coated with an oxide silicon film thereon; and
    a polymer waveguide formed at a portion of the silicon substrate and consists of a core layer, an upper cladding layer, and a lower cladding layer;
    wherein the effective refractive index of a light transmitted in the waveguide in the fundamental mode is larger than the refractive index of the oxide film; and the oxide silicon film functions as a waveguide.

7. An optical module including:
    a silicon substrate coated with an oxide silicon film thereon; and
    a polymer waveguide formed at a portion of the silicon substrate and consisting of a core layer, an upper cladding layer, and a lower cladding layer;
    wherein these three layers and the oxide film are combined so as to function as a waveguide; and
    the optical intensity of a light transmitted in the waveguide in the fundamental mode in the lamination direction of the waveguide is distributed asymmetrically to the center line of the core layer.

8. An optical module including:
    a silicon substrate coated with an oxide silicon film thereon; and
    a polymer waveguide formed at a portion of the silicon substrate and consisting of a core layer and a lower cladding layer;
    wherein relational conditions of $d>\lambda/(2\pi \cdot (n_{core}^2 - n_{SiO2}^2)^{1/2})$ are satisfied when it is assumed that the thickness of the silicon oxide film is d, the refractive index of the oxide silicon film is $n_{SiO2}$, the refractive index of the core layer is $n_{core}$, and the wavelength of a light transmitted in the polymer waveguide is $\lambda$; and
    a semiconductor element is composed on another portion of the silicon substrate so that an end face of the element and an end face of the waveguide are coupled with each other optically within a predetermined error range.

9. An optical module including:
    a silicon substrate coated with an oxide silicon film thereon; and a polymer waveguide formed at a portion of the silicon substrate and consisting of a core layer and a lower cladding layer;

wherein the oxide silicon film functions as a waveguide;

a semiconductor optical element is composed on another portion of the silicon substrate so that an end face of the element and an end face of the waveguide are coupled with each other optically within a predetermined error range.

10. An optical module including:

a silicon substrate coated with an oxide silicon film thereon; and a polymer waveguide formed at a portion of the silicon substrate and consisting of a core layer, an upper cladding layer, and a lower cladding layer;

wherein these three layers and the oxide film are combined so as to function as a waveguide;

a semiconductor optical element is composed on another portion of the silicon substrate so that an end face of the element and an end face of the waveguide are coupled with each other within a predetermined error range.

11. An optical module including:

a silicon substrate coated with an oxide silicon film thereon; and a polymer waveguide formed at a portion of the silicon substrate and consisting of a core layer, an upper cladding layer, and a lower cladding layer;

wherein the upper cladding layer is thicker than the lower cladding layer; and a semiconductor optical element is composed on another portion of the silicon substrate so that an end face of the element and an end face of the waveguide are coupled with each other optically within a predetermined error range.

12. An optical module including:

a silicon substrate coated with an oxide silicon film thereon; and a polymer waveguide formed at a portion of the silicon substrate and consisting of a core layer, an upper cladding layer, and a lower cladding layer;

wherein the effective refractive index of a light transmitted in the waveguide in the fundamental mode is larger than the refractive index of the oxide film;

the oxide silicon film functions as a waveguide; and a semiconductor optical element is composed on another portion of the silicon substrate so that an end face of the element and an end face of the waveguide are coupled with each other optically within a predetermined error range.

13. An optical module including:

a silicon substrate coated with an oxide silicon film thereon; and a polymer waveguide formed at a portion of the silicon substrate and consisting of a core layer, an upper cladding layer, and a lower cladding layer;

wherein these three layers and the oxide film are combined so as to function as a waveguide;

the optical intensity of a light transmitted in the waveguide in the fundamental mode in the lamination direction of the waveguide is distributed asymmetrically to the center line of the core layer; and a semiconductor optical element is composed on another portion of the silicon substrate so that an end face of the element and an end face of the waveguide are coupled with each other optically within a predetermined error range.

14. A transmitter including:

a silicon substrate coated with an oxide silicon film thereon;

a polymer waveguide formed at a portion of the silicon substrate and consisting of a core layer, an upper cladding layer, and a lower cladding layer; and a 1:n (n: integer) optical branching circuit formed on the silicon substrate and provided with the polymer waveguide;

wherein relational conditions of $d > \lambda/(2\pi \cdot (n_{core}^2 - n_{SiO2}^2)^{1/2})$ are satisfied when it is assumed that the thickness of the silicon oxide film is d, the refractive index of the oxide silicon film is $n_{SiO2}$, the refractive index of the core layer is $n_{core}$, and the wavelength of a light transmitted in the polymer waveguide is $\lambda$; and first and second semiconductor laser elements having a different oscillation wavelength respectively are formed on another portion of the silicon substrate; and end faces of the first and second laser elements and end faces of the first and second branching waveguides of the branching circuit are composed so as to be coupled optically with each other within a predetermined error range;

each of the first and second semiconductor laser elements is provided with means for driving itself;

a non-branching side end face of the optical branching circuit and an end face of an optical fiber are composed so as to be coupled optically with each other within a predetermined error range;

a fiber amplifier is connected to the optical fiber; and the thickness of the substrate where the waveguide is formed is practically the same as the thickness of the substrate where the element is provided in a cross sectional view of the substrate.

15. A transmitter including:

a silicon substrate coated with an oxide silicon film thereon;

a polymer waveguide formed at a portion of the silicon substrate and consisting of a core layer and a lower cladding layer; and a 1:n optical branching circuit formed on the silicon substrate and provided with the polymer waveguide;

wherein the oxide silicon film functions as a waveguide;

first and second semiconductor laser elements having a different oscillation wavelength respectively are formed on another portion of the silicon substrate; and end faces of the first and second elements and end faces of the first and second branching waveguides of the branching circuit are composed so as to be coupled optically with each other within a predetermined error range;

each of the first and second semiconductor laser diodes is provided with means for driving itself;

a non-branched side end face of the optical branching circuit and an end face of an optical fiber are composed so as to be coupled optically with each other within a predetermined error range; and a fiber amplifier is connected to the optical fiber.

16. A transmitter including:

a silicon substrate coated with an oxide silicon film thereon; and a polymer waveguide formed at a portion of the silicon substrate and consisting of a core layer, an upper cladding layer, and a lower cladding layer; and a 1:n optical branching circuit formed on the silicon substrate and provided with the polymer waveguide;

wherein those three layers and the oxide film are combined so as to function as a waveguide;

first and second semiconductor laser elements having a different oscillation wavelength respectively are formed on another portion of the silicon substrate;

end faces of the first and second elements and end faces of the first and second branching waveguides composing of the branching circuits are composed so as to be coupled with each other optically within a predetermined error range;

each of the first and second semiconductor laser elements is provided with means for driving itself;

a non-branched side end face of the optical branching circuit and an end face of an optical fiber are composed so as to be coupled with each other optically within a predetermined error range; and a fiber amplifier is connected to the optical fiber.

17. A transmitter including:

a silicon substrate coated with an oxide silicon film thereon; and a polymer waveguide formed at a portion of the silicon substrate and consisting of a core layer, an upper cladding layer, and a lower cladding layer; and a 1:n optical branching circuit formed on the silicon substrate and provided with the polymer waveguide;

wherein the upper cladding layer is thicker than the lower cladding layer;

first and second semiconductor laser elements having a different oscillation wavelength respectively are formed on another portion of the silicon substrate; and end faces of the first and second elements and end faces of the first and second branching waveguides of the branching circuit are composed so as to be coupled optically with each other within a predetermined error range;

each of the first and second semiconductor laser elements is provided with means for driving itself;

a non-branched side end face of the optical branching circuit and an end face of an optical fiber are composed so as to be coupled optically with each other within a predetermined error range; and a fiber amplifier is connected to the optical fiber.

18. A transmitter including:

a silicon substrate coated with an oxide silicon film thereon;

a polymer waveguide formed at a portion of the silicon substrate and consisting of a core layer, an upper cladding layer, and a lower cladding layer; and a 1:n optical branching circuit formed on the silicon substrate and provided with the polymer waveguide;

wherein the effective refractive index of a light transmitted in the waveguide in the fundamental mode is larger than the refractive index of the oxide film; and the oxide silicon film functions as a waveguide;

first and second semiconductor laser elements having a different oscillation wavelength respectively are formed on another portion of the silicon substrate; and end faces of the first and second elements and end faces of the first and second branching waveguides of the branch circuit are composed so as to be coupled optically with each other within a predetermined error range;

each of the first and second semiconductor laser elements is provided with means for driving itself;

a non-branched side end face of the optical branching circuit and an end face of an optical fiber are composed so as to be coupled optically with each other within a predetermined error range; and a fiber amplifier is connected to the optical fiber.

19. A transmitter including:

a silicon substrate coated with an oxide silicon film thereon; and a polymer waveguide formed at a portion of the silicon substrate and consisting of a core layer, an upper cladding layer, and a lower cladding layer;

a 1:n optical branching circuit formed on the silicon substrate and provided with the polymer waveguide;

wherein those three layers and the oxide film are combined so as to function as a waveguide;

the optical intensity of a light transmitted in the waveguide in the fundamental mode in the lamination direction of the waveguide is distributed asymmetrically to the center line of the core layer;

first and second semiconductor laser elements having a different oscillation wavelength respectively are formed on another portion of the silicon substrate; and end faces of the first and second elements and end faces of the first and second branching waveguides of the branching circuit are composed so as to be coupled with each other optically with within a predetermined error range;

each of the first and second semiconductor laser elements is provided with means for driving itself;

the non-branched side end face of the optical branching circuit and an end face of an optical fiber are composed so as to be coupled optically with each other within a predetermined error range; and a fiber amplifier is connected to the optical fiber.

20. A receiver including:

a silicon substrate coated with an oxide silicon film thereon;

a polymer waveguide formed at a portion of the substrate and consisting of a core layer and a lower cladding layer;

a wavelength division wavelength multiplexer/demultiplexer formed on the silicon substrate and provided with the polymer waveguide;

wherein relational conditions of $d > \lambda/(2\pi \cdot (n_{core}^2 - n_{SiO2}^2)^{1/2})$ are satisfied when it is assumed that the thickness of the silicon oxide film is d, the refractive index of the oxide silicon film is $n_{SiO2}$, the refractive index of the core layer is $n_{core}$, and the wavelength of a light transmitted in the polymer waveguide is $\lambda$;

an optical input side end face of the wavelength division wavelength multiplexer/demultiplexer and an end face of an optical fiber are composed so as to be coupled with each other optically within a predetermined error range;

a fiber amplifier is connected to the optical fiber; the received light is demultiplexed in the wavelength division multiplexer/demultiplexer, then transferred to the first and second end faces of the first and second waveguides composing part of the wavelength division wavelength multiplexer/demultiplexer;

the first and second end faces of the first and second waveguides and the first and second end faces of a photo-diode array element provided on another portion of the silicon substrate are composed so as to be coupled optically with each other within a predetermined error range; and the receiver is further provided with means for converting the signal received by the element to an electric signal.

21. A receiver including:

a silicon substrate coated with an oxide film thereon;

a polymer waveguide formed at a portion of the substrate and consisting a core layer, an upper cladding layer, and a lower cladding layer; and a wavelength division wavelength multiplexer/demultiplexer formed on the silicon substrate and provided with the polymer waveguide;

wherein the oxide silicon film functions as a waveguide;

an optical input side end face of the wavelength division wavelength multiplexer/demultiplexer and an end face of an optical fiber are composed so as to be coupled optically with each other optically within a predetermined error range;

a fiber amplifier is connected to the optical fiber;

the optical signal, which is entered to the fiber amplifier and multiplexed therein, is demultiplexed in the wavelength division multiplexer/demultiplexer, then transferred to the first and second end faces of the first and second waveguides composing part of the wavelength division multiplexer/demultiplexer;

the first and second end faces of the first and second waveguides and the first and second end faces of a photo-diode array element provided at another portion of the silicon substrate are composed so as to be coupled optically with each other within a predetermined error range; and the receiver is further provided with means for converting the signal received by the element to an electric signal.

22. A receiver including:

a silicon substrate coated with an oxide silicon film thereon;

a polymer waveguide formed at a portion of the silicon substrate and consisting of a core layer, an upper cladding layer, and a lower cladding layer; and a wavelength division wavelength multiplexer/demultiplexer formed on the substrate and provided with the polymer waveguide;

wherein those three layers and the oxide film are combined so as to function as a waveguide;

an optical input side end face of the wavelength division wavelength multiplexer/demultiplexer and an end face of an optical fiber are composed so as to be coupled with each other optically within a predetermined error range;

a fiber amplifier is connected to the optical fiber;

the optical signal, which is entered to the fiber amplifier and multiplexed therein, is demultiplexed in the wavelength division multiplexer/demultiplexer, then transferred to the first and second end faces of the first and second waveguides composing part of the wavelength division multiplexer/demultiplexer;

the first and second end faces of the first and second waveguides and the first and second end faces of a photo-diode array element provided at another portion of the silicon substrate are composed so as to be coupled optically with each other within a predetermined error range; and the receiver is further provided with means for converting the signal received by the element to an electric signal.

23. A receiver including:

a silicon substrate coated with an oxide film thereon;

a polymer waveguide formed at a portion of the silicon substrate and consisting a core layer, an upper cladding layer, and a lower cladding layer;

a wavelength division wavelength multiplexer/demultiplexer formed on the silicon substrate and provided with the polymer waveguide;

wherein the upper cladding layer is thicker than the lower cladding layer;

an optical input side end face of the wavelength division wavelength multiplexer/demultiplexer and an end face of an optical fiber are composed so as to be coupled with each other optically within a predetermined error range;

a fiber amplifier is connected to the optical fiber;

the optical signal, which is entered to the fiber amplifier and multiplexed therein, is demultiplexed in the wavelength division multiplexer/demultiplexer, then transferred to the first and second end faces of the first and second waveguides composing part of the wavelength division multiplexer/demultiplexer;

the first and second end faces of the first and second waveguides and the first and second end faces of a photo-diode array element provided on another portion of the silicon substrate are composed so as to be coupled optically with each other within a predetermined error range; and the receiver is further provided with means for converting the signal received by the element to an electric signal.

24. A receiver including:

a silicon substrate coated with an oxide film thereon;

a polymer waveguide formed at a portion of the silicon substrate and consisting of a core layer, an upper cladding layer, and a lower cladding layer;

a wavelength division multiplexer/demultiplexer formed on the silicon substrate and provided with the polymer waveguide;

wherein the effective refractive index of a light transmitted in the waveguide in the fundamental mode is larger than the refractive index of the oxide film;

the oxide silicon film functions as a waveguide;

an optical input side end face of the wavelength division multiplexer/demultiplexer and an end face of an optical fiber are composed so as to be coupled with each other optically within a predetermined error range;

a fiber amplifier is connected to the optical fiber;

the optical signal, which is entered to the fiber amplifier and multiplexed therein, demultiplexed in the wavelength division multiplexer/demultiplexer, then transferred to the first and second end faces of the first and second waveguides composing part of the wavelength division multiplexer/demultiplexer;

the first and second end faces of the first and second wave idea and the first and second end faces of a photo-diode array element provided at another portion of the silicon substrate are composed so as to be coupled optically with each other within a predetermined error range; and the receiver is further provided with means for converting the signal received by the element to an electric signal.

25. A receiver including:
   a silicon substrate coated with an oxide film thereon;
   a polymer waveguide formed at a portion of the substrate and consisting a core layer, an upper cladding layer, and a lower cladding layer; and
   a wavelength division multiplexer/demultiplexer formed on the silicon substrate and provided with the polymer waveguide;
   wherein those three layers and the oxide film are combined so as to function as a waveguide;
   the optical intensity of a light transmitted in the waveguide in the lamination direction of the waveguide is distributed asymmetrically to the center line of the core layer;
   an optical input side end face of the wavelength division multiplexer/demultiplexer and an end face of an optical fiber are composed so as to be coupled with each other optically within a predetermined error range;
   a fiber amplifier is connected to the optical fiber;
   the optical signal, which is entered to the fiber amplifier and multiplexed therein, is demultiplexed in the wavelength division multiplexer/demultiplexer, then transferred to the first and second end faces of the first and second waveguides composing part of the wavelength division multiplexer/demultiplexer;
   the first and second end faces of the first and second waveguides and the first and second end faces of a photo-diode array element provided at another portion of the silicon substrate are composed so as to be coupled optically with each other within a predetermined error range; and
   the receiver is further provided with means for converting the signal received by the element to an electric signal.

26. An optical switching unit including:
   a silicon substrate coated with an oxide silicon film thereon;
   a polymer waveguide formed at a portion of the substrate and consisting of a core layer and a lower cladding layer; and
   an optical switch formed with one or more 1:n (n: integer) optical branching circuits combined on the silicon substrate and provided with the polymer waveguide respectively;
   wherein relational conditions of $d > \lambda/(2\pi \cdot (n_{core}^2 - n_{SiO2}^2)^{1/2})$ are satisfied when it is assumed that the thickness of the silicon oxide film is d, the refractive index of the oxide silicon film is $n_{SiO2}$, the refractive index of the core layer is $n_{core}$, and the wavelength of a light transmitted in the polymer waveguide is $\lambda$.

27. An optical switching unit including:
   a silicon substrate coated with an oxide silicon film thereon;
   a polymer waveguide formed at a portion of the silicon substrate and consisting of a core layer and a lower cladding layer; and
   an optical switch formed with one or more 1:n (n: integer) optical branching circuits combined on the silicon substrate and provided with the polymer waveguide respectively;
   wherein said oxide silicon film functions as a waveguide.

28. An optical switching unit including:
   a silicon substrate coated with an oxide silicon film thereon;
   a polymer waveguide formed at a portion of the waveguide and consisting of a core layer, an upper cladding layer, and a lower cladding layer; and
   an optical switch formed with one or more 1:n (n: integer) optical branching circuits combined on the silicon substrate and provided with the polymer waveguide respectively;
   wherein those three layers and the oxide silicon film are combined so as to function as a waveguide.

29. An optical switching unit including:
   a silicon substrate coated with an oxide silicon film thereon; and
   a polymer waveguide formed at a portion of the silicon substrate and consisting of a core layer, an upper cladding layer, and a lower cladding layer;
   an optical switch formed with one or more 1:n (n: integer) optical branching circuits combined on the silicon substrate and provided with the polymer waveguide respectively;
   wherein the upper cladding layer is thicker than the lower cladding layer.

30. An optical switching unit including:
   a silicon substrate coated with an oxide silicon film thereon;
   the polymer waveguide formed at a portion of the silicon substrate and consisting of a core layer, an upper cladding layer, and a lower cladding layer;
   an optical switch formed with one or more 1:n (n: integer) optical branching circuits combined on the silicon substrate and provided with the polymer waveguide respectively;
   wherein the effective refractive index of a light transmitted in the waveguide in the fundamental mode is larger than the refractive index of the oxide film; and
   the oxide silicon film functions as a waveguide.

31. An add-and-drop multiplexing unit including:
   a silicon substrate coated with an oxide silicon film thereon;
   a polymer waveguide formed at a portion of the substrate and consisting of a core layer and a lower cladding layer; and
   an optical switch formed with a plurality of 1:n (n: integer) optical branching circuits combined on the silicon substrate and provided with the polymer waveguide respectively;
   wherein relational conditions of $d > \lambda/(2\pi \cdot (n_{core}^2 - n_{SiO2}^2)^{1/2})$ are satisfied when it is assumed that the thickness of the silicon oxide film is d, the refractive index of the oxide silicon film is $n_{SiO2}$, the refractive index of the core layer is $n_{core}$, and the wavelength of a light transmitted in the polymer waveguide is $\lambda$;
   the add-and-drop multiplexing unit is composed so as to receive an optical signal which is multiplexed, then demultiplexed in a WDM demultiplexer at one input terminal and receive another optical signal from an optical transmitter at the other input terminal of each of first and second optical switches respectively; and
   each of the first and second optical switches can add or drop the optical signal received at each input terminal, thereby dropping the signal to the optical receiver and outputting the signal to the WDM multiplexer at the same time.

32. An add-and-drop multiplexing unit including:
   a silicon substrate coated with an oxide silicon film thereon;

a polymer waveguide formed at a portion of the substrate and consisting of a core layer and a lower cladding layer; and an optical switch formed with a plurality of 1:n (n: integer) optical branching circuits combined on the silicon substrate and provided with the polymer waveguide respectively;

wherein the oxide silicon film functions as a waveguide;

the add-and-drop multiplexing unit is composed so as to receive an optical signal which is multiplexed, then demultiplexed in a WDM demultiplexer at one input terminal and receive another optical signal from an optical transmitter at the other input terminal of each of first and second optical switches respectively; and each of the first and second optical switches can add or drop the optical signal received at each input terminal, thereby dropping the signal to the optical receiver and outputting the signal to the WDM multiplexer at the same time.

33. An add-and-drop multiplexing unit including:

a silicon substrate coated with an oxide silicon film thereon;

a polymer waveguide formed at a portion of the silicon substrate and consisting of a core layer, an upper cladding layer, and a lower cladding layer; and an optical switch formed with a plurality of 1:n (n: integer) optical branching circuits combined on the silicon substrate and provided with the polymer waveguide respectively;

those three layers and the oxide silicon film are combined so as to function as a waveguide;

the add-and-drop multiplexing unit is composed so as to receive an optical signal which is multiplexed, then demultiplexed in a WDM demultiplexer at one input terminal and receive another optical signal from an optical transmitter at the other input terminal of each of first and second optical switches; and each of the first and second optical switches can add or drop the optical signal received at each input terminal, thereby dropping the signal to the optical receiver and outputting the signal to the WDM multiplexer at the same time.

34. An add-and-drop multiplexing unit including:

a silicon substrate coated with an oxide silicon film thereon;

a polymer waveguide formed at a portion of the silicon substrate and consisting of a core layer, an upper cladding layer, and a lower cladding layer;

an optical switch formed with one or more 1:n (n: integer) optical branching circuits combined on the silicon substrate and provided with the polymer waveguide respectively;

wherein the upper cladding layer is thicker than the lower cladding layer;

the add-and-drop multiplexing unit is composed so as to receive an optical signal which is multiplexed, then demultiplexed in a WDM demultiplexer at one input terminal and receive an optical signal from an optical transmitter at the other input terminal of each of first and second optical switches; and each of the first and second optical switches can add or drop the optical signal received at each input terminal, thereby dropping the signal to the optical receiver and outputting the signal to the WDM multiplexer at the same time.

35. An add-and-drop multiplexing unit including:

a silicon substrate coated with an oxide silicon film thereon;

a polymer waveguide formed at a portion of the silicon substrate and consisting of a core layer, an upper cladding layer, and a lower cladding layer;

an optical switch formed with a plurality of 1:n (n: integer) optical branching circuits combined on the silicon substrate and provided with the polymer waveguide respectively;

wherein the effective refractive index of a light transmitted in the waveguide in the fundamental mode is larger than the refractive index of the oxide film;

the oxide silicon film functions as a waveguide;

the add-and-drop multiplexing unit is composed so as to receive an optical signal which is multiplexed, then demultiplexed in a WDM demultiplexer at one input terminal and receive another optical signal from an optical transmitter at the other input terminal of each of first and second optical switches; and each of the first and second optical switches can add or drop the optical signal received at each input terminal, thereby dropping the signal to the optical receiver and outputting the signal to the WDM multiplexer at the same time.

36. An add-and-drop multiplexing unit including:

a silicon substrate coated with an oxide silicon film thereon;

a polymer waveguide formed on the silicon substrate and consisting of a core layer, an upper cladding layer, and a lower cladding layer;

an optical switch formed with a plurality of 1:n (n: integer) optical branching circuits combined on the silicon substrate and provided with the polymer waveguide respectively;

wherein those layers and the oxide film are composed to function as a waveguide;

the optical intensity of a light transmitted in the waveguide in the lamination direction of the waveguide is distributed asymmetrically to the center line of the core layer;

add-and-drop multiplexing unit is composed so as to receive an-optical signal whose wavelength is multiplexed, then demultiplexed in a WDM demultiplexer at one input terminal and receive another optical signal from an optical transmitter at the other input terminal of each of first and second optical switches; and each of the first and second optical switches can add or drop the optical signal received at each input terminal, thereby dropping the signal, to the optical receiver and outputting the signal to the WDM multiplexer at the same time.

37. An optical module, a transmitter, a receiver, an optical switching unit, or an add-and-drop multiplexing unit in accordance with any of items 1 to 36;

wherein an electrode is provided between the substrate and the semiconductor elements.

38. An optical module, a transmitter, a receiver, an optical switching unit, or an add-and-drop multiplexing unit in accordance with any of items 2 to 7 and 9 to 36;

wherein the thickness of the substrate where-the waveguide is provided is practically the same as the thickness of the substrate where the element is provided in a cross sectional view of the substrate.

39. An optical module, a transmitter, a receiver, an optical switching unit, or an add-and-drop multiplexing unit in accordance with any of items 1 to 36;

wherein another layer is formed between the substrate and the waveguide.

40. An optical module, a transmitter, a receiver, an optical switching unit, or an add-and-drop multiplexing unit in accordance with item 39;

wherein the layer formed between the substrate and the waveguide is a thin film layer.

41. An optical module, a transmitter, a receiver, an optical switching unit, or an add-and-drop multiplexing unit in accordance with any of items 1 to 36;

wherein the oxide silicon film on which the waveguide is formed functions to reduce the leakage of the light transmitted in the waveguide to the silicon substrate.

42. An optical module, a transmitter, a receiver, an optical switching unit, or an add-and-drop multiplexing unit in accordance with any of items 1, 4, 5, 7, 10, 11, 13, 16, 17, 19, 22, 23, 25, 28, 29, 33, 34, and 36;

wherein the optical intensity of a light transmitted through the waveguide is distributed wider towards the end on the upper cladding layer than on the lower cladding layer.

43. An optical module, a transmitter, a receiver, an optical switching unit, or an add-and-drop multiplexing unit in accordance with any of items 1 to 36;

wherein the height between the surface of the oxide silicon film and the center of the core layer of the polymer waveguide is 5 to 12 μm.

44. An optical module, a transmitter, a receiver, an optical switching unit, or an add-and-drop multiplexing unit in accordance with any of items 1 to 5, 7 to 11, 19 to 23,. 25 to 29, and 31 to 34;

wherein the lower cladding layer is 3 to 9 μm in thickness and the core layer is 5 to 8 μm in thickness respectively.

45. An optical module, a transmitter, a receiver, an optical switching unit, or an add-and-drop multiplexing unit in accordance with any of items 1, 4, 5, 7, 10, 11, 13, 16, 17, 1, 9, 22, 23, 25, 28, 29, 33, 34, and 36;

wherein the upper cladding layer is thicker than the lower cladding layer and the thickness of the upper cladding layer is 10 μm or over.

46. An optical module, a transmitter, a receiver, an optical switching unit, or an add-and-drop multiplexing unit in accordance with any of items 1 to 36;

wherein the oxide silicon film is 0.25 to 1.5 μm in thickness.

47. An optical module, a transmitter, a receiver, an optical switching unit, or an add-and-drop multiplexing unit in accordance with any of items 1 to 5, 7 to 11, 13 to 17, 19 to 23, 25 to 29, and 31 to 34;

wherein the refractive index of the polymer used to compose the core layer is 1.47 to 1.7.

48. An optical module, a transmitter, a receiver, an optical switching unit, or an add-and-drop multiplexing unit in accordance with any of items 1 to 5, 7 to 11, 13 to 17, 19 to 23, 25 to 29, and 31 to 34;

wherein the oxide silicon film is 0.4 to 1.5/im in thickness and the refractive index of the polymer used to compose the core layer is 1.47 to 1.55.

49. An optical module, a transmitter, a receiver, an optical switching unit, or an add-and-drop multiplexing unit in accordance with any of items 1, 4, 5, 7, 10, 11, 13, 16, 17, 19, 22, 23, 25, 28, 19, 33, 34, and 36;

wherein the refractive index of the core layer is 0.3 to 1.0% higher than those of the lower and upper cladding layers.

50. An optical module, a transmitter, a receiver, an optical switching unit, or an add-and-drop multiplexing unit in accordance with any of items 1, 4, 5, 7, 10, 11, 13, 16, 17, 19, 22, 23, 25, 28, 19, 33, 34, and 36;

wherein each of the lower cladding layer, the core layer, and the upper cladding layer is composed of fluorinate polyimide.

51. An optical module in accordance with any of 8 to 13;

wherein the element is a semiconductor laser element or a waveguide type photo-diode.

52. A method for fabricating an optical module including the following processes:

(1) The d, $n_{SiO2}$, $n_{core}$, and λ values are predetermined so that the relational conditions of $d>\lambda/(2\pi \cdot (n_{core}^2 - n_{SiO2}^2)^{1/2})$ are satisfied when it is assumed that the thickness of the silicon oxide film is d, the refractive index of the oxide silicon film is $n_{SiO2}$, the refractive index of the core layer is $n_{core}$, and the wavelength of a light transmitted in the polymer waveguide is λ.

(2) A lower cladding layer and a core layer are formed with polymer on a flat silicon substrate whose surface is oxidized.

(3) The lower cladding layer and the core layer are patterned, thereby forming a waveguide and the upper cladding layer is formed with polymer so as to cover the waveguide.

(4) The polymer layer is removed forming the semiconductor optical element on the flat substrate so as to be coupled with the polymer waveguide optically.

53. A method for fabricating an optical module in accordance with item 52, wherein said method includes a process for forming an electrode on the flat substrate so as to be used for the semiconductor optical element in prior to the process (1).

54. A method for fabricating an optical module in accordance with item 52;

wherein an end face of the polymer waveguide or an optical integrated circuit provided with the polymer waveguide is coupled with an end face of the semiconductor optical element optically via a space.

What is claimed is:

1. An optical module including:

a silicon substrate coated with an oxide silicon film thereon; and a polymer waveguide formed at a portion of said silicon substrate, said waveguide consisting of a core layer, an upper cladding layer, and a lower cladding layer;

wherein relational conditions of $d>\lambda/(2\pi \cdot (n_{core}^2 - n_{SiO2}^2)^{1/2})$ are satisfied when it is assumed that the thickness of said silicon oxide film is d, the refractive index of said oxide silicon film is $n_{SiO2}$, the refractive index of said core layer is $n_{core}$, and the wavelength of a light transmitted in said polymer waveguide is λ; and a semiconductor optical element is formed at another portion of said silicon substrate;

wherein an end face of said waveguide and an end face of said element are composed so as to be coupled with each other optically within a predetermined error range; and the thickness of said substrate where said waveguide is formed is practically the same as the thickness of said substrate where said element is formed in a cross sectional view of said substrate.

2. An optical module including:

a silicon substrate coated with an oxide silicon film thereon; and a polymer waveguide formed at a portion of said silicon substrate, said waveguide consisting of a core layer and a lower cladding layer;

wherein relational conditions of $d > \lambda/(2\pi \cdot (n_{core}^2 - n_{SiO2}^2)^{1/2})$ are satisfied when it is assumed that the thickness of said silicon oxide film is d, the refractive index of said oxide silicon film is $n_{SiO2}$, the refractive index of said core layer is $n_{core}$, and the wavelength of a light transmitted in said polymer waveguide is $\lambda$.

3. An optical module including:

a silicon substrate coated with an oxide silicon film thereon; and a polymer waveguide formed at a portion of said silicon substrate, said waveguide consisting of a core layer, an upper cladding layer, and a lower cladding layer;

wherein the effective refractive index of a light transmitted in said waveguide in the fundamental mode is larger than the refractive index of said oxide film; and said oxide silicon film functions as a waveguide.

4. An optical module including:

a silicon substrate coated with an oxide silicon film thereon; and a polymer waveguide formed at a portion of said silicon substrate, said waveguide consisting of a core layer, an upper cladding layer, and a lower cladding layer;

wherein these three layers and said oxide film are combined so as to function as a waveguide; and the optical intensity of said light transmitted in said waveguide in said fundamental mode in the lamination direction of said waveguide is distributed asymmetrically to the center line of said core layer.

5. An optical module including:

a silicon substrate coated with an oxide silicon film thereon; and a polymer waveguide formed at a portion of said silicon substrate, said waveguide including a core layer and a lower cladding layer;

wherein relational conditions of $d > \lambda/(2\pi \cdot (n_{core}^2 - n_{SiO2}^2)^{1/2})$ are satisfied when it is assumed that the thickness of said silicon oxide film is d, the refractive index of said oxide silicon film is $n_{SiO2}$, the refractive index of said core layer is $n_{core}$, and the wavelength of a light transmitted in said polymer waveguide is $\lambda$; and a semiconductor optical element is formed at another portion of said silicon substrate; and an end face of said waveguide and an end face of said element are composed so as to be coupled with each other optically within a predetermined error range.

6. An optical module including:

a silicon substrate coated with an oxide silicon film thereon; and a polymer waveguide formed at a portion of said silicon substrate, said waveguide consisting of a core layer, an upper cladding layer, and a lower cladding layer;

wherein the effective refractive index of a light transmitted in said waveguide in the fundamental mode is larger than the refractive index of said oxide film; and said oxide silicon film functions as a waveguide;

a semiconductor optical element is formed on another portion of said silicon substrate; and an end face of said element and an end face of said waveguide are composed so as to be coupled with each other optically within a predetermined error range.

7. An optical module including:

a silicon substrate coated with an oxide silicon film thereon; and a polymer waveguide formed at a portion of said silicon substrate coated with said oxide silicon film, said waveguide consisting of a core layer, an upper cladding layer, and a lower cladding layer;

wherein these three layers and said oxide film are combined so as to function as a waveguide; and the optical intensity of said light transmitted in said waveguide in said fundamental mode in the lamination direction of said waveguide is distributed asymmetrically to the center line of said core layer; and a semiconductor optical element is formed on another portion of said silicon substrate;

an end face thereof and an end face of said waveguide are composed so as to be coupled with each other optically within a predetermined error range.

8. A transmitter including:

a silicon substrate coated with an oxide silicon film thereon;

a polymer waveguide formed at a portion of said silicon substrate and consisting of a core layer, an upper cladding layer, and a lower cladding layer; and a 1:n (n: integer) optical branching circuit provided with said polymer waveguide;

wherein relational conditions of $d > \lambda/(2\pi \cdot (n_{core}^2 - n_{SiO2}^2)^{1/2})$ are satisfied when it is assumed that the thickness of said silicon oxide film is d, the refractive index of said oxide silicon film is $n_{SiO2}$, the refractive index of said core layer is $n_{core}$ and the wavelength of a light transmitted in said polymer waveguide is $\lambda$;

first and second semiconductor laser elements having a different oscillation wavelength respectively are formed on another portion of said silicon substrate;

end faces of said first and second laser elements and end faces of first and second branching waveguides of said branching circuit are composed so as to be coupled with each other optically within a predetermined error range;

each of said first and second laser elements is provided with means for driving itself;

a non-branching side end face of said optical branching circuit and an end face of an optical fiber are composed so as to be coupled with each other optically within a predetermined error range; and a fiber amplifier is connected to said optical fiber; and the thickness of said substrate where said waveguide is formed is practically the same as that of said substrate where said laser element is formed in a cross sectional view of said substrate.

9. A transmitter including:

a silicon substrate coated with an oxide silicon film thereon; and a polymer waveguide formed at a portion of said silicon substrate and consisting of a core layer and a lower cladding layer;

a 1:n (n: integer) optical branching circuit formed on the silicon substrate and provided with said polymer waveguide;

wherein said oxide silicon film functions as a waveguide;

first and second semiconductor laser elements having a different oscillation wavelength respectively are formed on another portion of said silicon substrate;

end faces of first and second branching waveguides of said branching circuit and end faces of said first and second laser elements are composed so as to be coupled with each other optically within a predetermined error range;

each of said first and second laser elements is provided with means for driving itself;

a non-branching side end face of said optical branching circuit and an end face of an optical fiber are composed so as to be coupled optically with each other within a predetermined error range; and a fiber amplifier is connected to said optical fiber.

10. A transmitter including:

a silicon substrate coated with an oxide silicon film thereon;

a polymer waveguide formed at a portion of said silicon substrate and consisting of a core layer, an upper cladding layer, and a lower cladding layer; and a 1:n (n: integer) optical branching circuit formed on said silicon substrate and provided with said polymer waveguide;

wherein those layers and said oxide film are composed so as to function as a waveguide;

first and second semiconductor laser elements having a different oscillation wavelength respectively are formed on another portion of said silicon substrate;

end faces of first and second branching waveguides of said branching circuit and end faces of said first and second laser elements are composed so as to be coupled with each other optically within a predetermined error range;

each of said first and second laser elements is provided with means for driving itself;

a non-branching side end face of said optical branching circuit and an end face of an optical fiber are composed so as to be coupled optically with each other within a predetermined error range; and a fiber amplifier is connected to said optical fiber.

11. A transmitter including:

a silicon substrate coated with an oxide silicon film thereon;

a polymer waveguide formed at a portion of said silicon substrate and consisting of a core layer, an upper cladding layer, and a lower cladding layer; and a 1:n (n: integer) optical branching circuit formed on said silicon substrate and provided with said polymer waveguide;

wherein said upper cladding layer is thicker than said lower cladding layer;

first and second semiconductor laser elements having a different oscillation wavelength respectively are formed on another portion of said silicon substrate;

end faces of first and second waveguides of said branching circuit and end faces of said first and second laser elements are composed so as to be coupled optically with each other within a predetermined error range;

each of said first and second laser elements is provided with means for driving itself;

a non-branching side end face of said optical branching circuit and an end face of an optical fiber are composed so as to be coupled optically with each other within a predetermined error range; and a fiber amplifier is connected to said optical fiber.

12. A transmitter including:

a silicon substrate coated with an oxide silicon film thereon;

a polymer waveguide formed at a portion of said silicon substrate and consisting of a core layer, an upper cladding layer, and a lower cladding layer; and a 1:n (n: integer) optical branching circuit formed on said silicon substrate and provided with said polymer waveguide;

wherein the effective refractive index of a light transmitted in said waveguide in the fundamental mode is larger than the refractive index of said oxide film; and said oxide silicon film functions as a waveguide;

first and second semiconductor laser elements having a different oscillation wavelength respectively are formed on another portion of said silicon substrate;

end faces of first and second branching waveguides of said branching circuit and end faces of said first and second laser elements are composed so as to be coupled optically with each other within a predetermined error range;

each of said first and second laser elements is provided with means for driving itself;

a non-branching side end face of said optical branching circuit and an end face of an optical fiber are composed so as to be coupled optically with each other within a predetermined error range; and a fiber amplifier is connected to said optical fiber.

13. A transmitter including:

a silicon substrate coated with an oxide silicon film thereon; and a polymer waveguide formed at a portion of said silicon substrate, said waveguide consisting of a core layer, an upper cladding layer, and a lower cladding layer;

wherein these three layers and said oxide film are combined so as to function as a waveguide;

the optical intensity of said light transmitted in said waveguide in said fundamental mode in the lamination direction of said waveguide is distributed asymmetrically to the center line of said core layer;

first and second semiconductor laser elements having a different oscillation wavelength respectively are formed on another portion of said silicon substrate;

end faces of first and second branching waveguides of said branching circuit and end faces of said first and second laser elements are composed so as to be coupled optically with each other within a predetermined error range;

each of said first and second laser elements is provided with means for driving itself;

a non-branching side end face of said optical branching circuit and an end face of an optical fiber are composed so as to be coupled optically with each other within a predetermined error range;

a fiber amplifier is connected to said optical fiber.

14. A receiver including:

a silicon substrate coated with an oxide silicon film thereon;

a polymer waveguide formed at a portion of said silicon substrate and consisting of a core layer, an upper cladding layer, and a lower cladding layer; and a wavelength division wavelength multiplexer/ demultiplexer formed on said silicon substrate and provided with said waveguide;

wherein relational conditions of $d > \lambda/(2\pi \cdot (n_{core}^2 - n_{SiO2}^2)^{1/2})$ are satisfied when it is assumed that the thickness of said silicon oxide film is d, the refractive index of said oxide silicon film is $n_{SiO2}$, the refractive index of said core layer is $n_{core}$, and the wavelength of a light transmitted in said polymer waveguide is $\lambda$;

an optical input side end face of said wavelength division wavelength multiplexer/demultiplexer and an end face of an optical fiber are composed so as to be coupled optically with each other within a predetermined error range;

a fiber amplifier is connected to said optical fiber;

said received light is demultiplexed in said wavelength division wavelength multiplexer/demultiplexer, then transferred to first and second end faces of said first and second waveguides composing part of said wavelength division wavelength multiplexer/demultiplexer respectively;

first and second end faces of said first and second waveguides and first and second end faces of a photo-diode provided on another portion of said silicon substrate are composed so as to be coupled optically with each other within a predetermined error range; and said receiver is further provided with means for converting said signal received by said element to an electric signal.

15. A receiver including:

a silicon substrate coated with an oxide silicon film thereon;

a polymer waveguide formed at a portion of said silicon substrate and consisting of a core layer, an upper cladding layer, and a lower cladding layer; and a wavelength division wavelength multiplexer/ demultiplexer formed on said silicon substrate and provided with said polymer waveguide;

wherein said oxide silicon film functions as a waveguide;

an optical input side end face of said wavelength division wavelength multiplexer/demultiplexer and an end face of an optical fiber are composed so as to be coupled optically with each other within a predetermined error range;

a fiber amplifier is connected to said optical fiber;

said received light, which is entered to and multiplexed by said fiber amplifier, is demultiplexed in said wavelength division wavelength multiplexer/demultiplexer, then transferred to first and second end faces of said first and second waveguides composing part of said wavelength division wavelength multiplexer/ demultiplexer respectively;

first and second end faces of said first and second waveguides and first and second end faces of a photo-diode provided on another portion of said silicon substrate are composed so as to be coupled optically with each other within a predetermined error range; and said receiver is further provided with means for converting said signal received by said element to an electric signal.

16. A receiver including:

a silicon substrate coated with an oxide silicon film thereon; and a polymer waveguide formed on said silicon waveguide so as to consist of a core layer and a lower cladding layer;

wherein those three layers and said oxide film are composed so as to function as a waveguide;

an optical input side end face of said mixer and an end face of an optical fiber are composed so as to be coupled optically with each other within a predetermined error range;

a fiber amplifier is connected to said optical fiber;

said received light, which is entered to and multiplexed by said fiber amplifier, is demultiplexed in said mixer, then transferred to first and second end faces of said first and second waveguides composing part of said mixer respectively;

said first and second end faces and first and second end faces of a photo-diode provided on another portion of said silicon substrate are composed so as to be coupled optically with each other within a predetermined error range; and said receiver is further provided with means for converting said signal received by said element to an electric signal.

17. A receiver including:

a silicon substrate coated with an oxide silicon film thereon;

a polymer waveguide formed at a portion of said silicon substrate and consisting of a core layer, an upper cladding layer, and a lower cladding layer; and a wavelength division wavelength multiplexer/ demultiplexer formed on said silicon substrate and provided with said polymer waveguide;

wherein said upper cladding layer is thicker than said lower cladding layer;

an optical input side end face of said wavelength division wavelength multiplexer/demultiplexer and an end face of an optical fiber are composed so as to be coupled optically with each other within a predetermined error range;

a fiber amplifier is connected to said optical fiber;

said received light, which is entered to and multiplexed by said fiber amplifier, is demultiplexed in said wavelength division wavelength multiplexer/demultiplexer, then transferred to first and second end faces of said first and second waveguides composing part of said wavelength division wavelength multiplexer/ demultiplexer respectively;

said first and second end faces and first and second end faces of a photo-diode provided on another portion of said silicon substrate are composed so as to be coupled optically with each other within a predetermined error range; and said receiver is further provided with means for converting said signal received by said element to an electric signal.

18. A receiver including:

a silicon substrate coated with an oxide silicon film thereon;

a polymer waveguide formed at a portion of said silicon substrate and consisting of a core layer, an upper cladding layer, and a lower cladding layer; and a wavelength division wavelength multiplexer/ demultiplexer formed on said silicon substrate and provided with said polymer waveguide;

wherein the effective refractive index of a light transmitted in said waveguide in the fundamental mode is larger than the refractive index of said oxide film;

said oxide silicon film functions as a waveguide;

an optical input side end face of said wavelength division wavelength multiplexer/demultiplexer and an end face of an optical fiber are composed so as to be coupled optically with each other within a predetermined error range;

a fiber amplifier is connected to said optical fiber;

said received light, which is entered to and multiplexed by said fiber amplifier, is demultiplexed in said wavelength division wavelength multiplexer/demultiplexer, then transferred to first and second end faces of said first and second waveguides composing part of said wavelength division wavelength multiplexer/demultiplexer respectively;

said first and second end faces of said first and second waveguides and first and second end faces of a photo-diode provided on another portion of said silicon substrate are composed so as to be coupled optically with each other within a predetermined error range; and said receiver is further provided with means for converting said signal received by said element to an electric signal.

19. A receiver including:

a silicon substrate coated with an oxide silicon film formed thereon;

a polymer waveguide formed at a portion of said silicon substrate and consisting of a core layer, an upper cladding layer, and a lower cladding layer; and a wavelength division wavelength multiplexer/demultiplexer formed on said silicon substrate and provided with said polymer waveguide;

wherein these three layers and said oxide film are combined so as to function as a waveguide;

the optical intensity of said light transmitted in said waveguide in said fundamental mode in the lamination direction of said waveguide is distributed asymmetrically to the center line of said core layer;

an optical input side end face of said wavelength division wavelength multiplexer/demultiplexer and an end face of an optical fiber are composed so as to be coupled optically with each other within a predetermined error range;

a fiber amplifier is connected to said optical fiber;

said received light, which is entered to and multiplexed by said fiber amplifier, is demultiplexed in said wavelength division wavelength multiplexer/demultiplexer, then transferred to first and second end faces of said first and second waveguides composing part of said wavelength division wavelength multiplexer/demultiplexer respectively;

said first and second end faces and first and second end faces of a photo-diode provided on another portion of said silicon substrate are composed so as to be coupled optically with each other within a predetermined error range; and said receiver is further provided with means for converting said signal received by said element to an electric signal.

* * * * *